United States Patent [19]
Lee

[11] Patent Number: 5,716,566
[45] Date of Patent: Feb. 10, 1998

[54] METHOD FOR MAKING A MOTTLED AND PATTERNED PEN BARREL

[75] Inventor: Yeou-Ching Lee, Taipei, Taiwan

[73] Assignee: Alvin Lee Jewelry, Inc., Taipei, Taiwan

[21] Appl. No.: 634,209

[22] Filed: Apr. 18, 1996

Related U.S. Application Data

[63] Continuation-in-part of Ser. No. 319,287, Oct. 6, 1994, Pat. No. 5,529,733.

[51] Int. Cl.$^6$ .................................................. B29C 39/12
[52] U.S. Cl. .................... 264/73; 264/159; 264/162; 264/220; 264/225; 264/227; 264/245; 401/221; 425/175
[58] Field of Search ................... 264/73, 77, 159, 264/162, 220, 225, 108, 227, 245, 246; 401/221; 425/175

[56] References Cited

U.S. PATENT DOCUMENTS

| | | |
|---|---|---|
| 573,564 | 12/1896 | Ziegler-Reinacher . |
| 1,886,972 | 11/1932 | Payne .................................. 264/108 |
| 1,902,573 | 3/1933 | Neidich . |
| 1,915,936 | 6/1933 | Loomis . |
| 1,951,853 | 3/1934 | Walsh . |
| 1,972,166 | 9/1934 | Schneider et al. . |
| 2,019,590 | 11/1935 | Westra . |
| 2,044,356 | 6/1936 | Keeran . |
| 3,240,849 | 3/1966 | Eulgem et al. .................... 264/108 |
| 3,285,835 | 11/1966 | Farrow . |
| 3,287,481 | 11/1966 | Trojan et al. ....................... 264/108 |
| 3,773,602 | 11/1973 | Killmer . |
| 4,188,316 | 2/1980 | Sawada . |
| 4,551,297 | 11/1985 | Botcher . |
| 5,529,733 | 6/1996 | Lee ........................................ 264/73 |

FOREIGN PATENT DOCUMENTS

| | | | |
|---|---|---|---|
| 1912466 | 11/1969 | Germany | .............. 264/331.18 |
| 50-01892 | 1/1975 | Japan . | |

OTHER PUBLICATIONS

"From Raw Material to Fountain Pen" Plastics Engineering Modern Plastics, Jun. 1946, pp. 137–141.

Primary Examiner—Jeffery R. Thurlow
Attorney, Agent, or Firm—Woodard Emhardt Naughton Moriarty & McNett

[57] ABSTRACT

A method for making a mottled and patterned pen barrel is disclosed, wherein a tube is preformed to have two ends and an intermediate portion. At least one mold cavity is provided in a mold for forming the pen barrel. A pair of positioning members are sleeved respectively around two ends of the tube, and the positioning members are positioned in the mold cavity so as to center the tube in the mold cavity and so as to create, in the mold cavity, a molding space surrounding an entire peripheral surface of the intermediate portion. A liquid coating composition is poured into the molding space to form a cover integral with the entire peripheral surface of the intermediate portion. Finally, the covered tube is removed from the mold cavity and the positioning members are removed from the covered tube.

3 Claims, 4 Drawing Sheets

METHOD FOR MAKING A MOTTLED AND PATTERNED PEN BARREL

This application is a continuation-in-part application of U.S. patent application Ser. No. 08/319,287 which was filed on Oct. 6, 1994 which is now U.S. Pat. No. 5,529,733.

BACKGROUND OF THE INVENTION

1. Field of the Invention

This invention relates to a method for making a pen barrel and particularly to a method for making a mottled and patterned pen barrel.

2. Description of the Related Art

It is known to produce mottled and patterned pen barrels by using plastics of cellulose derivatives which provide a mottled effect, prior methods of manufacturing articles from cellulose plastics are costly since they involve many operations for processing cellulose plastic blanks such as stamping, sawing, drilling, grinding, etc., after compositions of cellulose derivatives are formed into blocks, sheets or the like as blanks. Earliest methods of forming celluloid blanks into tubes involve turning and drilling operations which waste a large amount of material. To alleviate the material waste, U.S. Pat. No. 1,915,936 suggests a method for making celluloid by shaping blanks into a tubular pen barrel with a ram in a die. This method is, however, still disadvantageous as it requires a costly stamping operation. U.S. Pat. No. 2,044,356 discloses a method of making celluloid tubes such as pen barrels in which celluloid strips are bonded to the outer surface of a celluloid tubular member. This method still involves a complicated task of bonding celluloid strips.

To provide a simple and inexpensive method of making a mottled and patterned pen barrel, the inventor of the application suggests an improved method of molding a pen barrel from a cheaper and more easily processible material which can provide a mottled effect like cellulose derivative plastics. The material comprises a composition which contains a polyester resin, a hardener and pattern imparting chips. The method, which simply involves pouring of the composition into a mold cavity to produce a mottled and patterned casting around a preformed tube, is advantageous for mass production.

SUMMARY OF THE INVENTION

The objective of the invention is to provide a method of making a mottled and patterned pen barrel, which utilizes an inexpensive material and which can be carried out easily, wherein the material used does not contain chips.

According to the present invention, a method for making a mottled and patterned pen barrel comprises: (a) preforming a tube having two ends and an intermediate portion between two ends; (b) providing at least one mold cavity in a mold for forming the pen barrel; (c) sleeving detachably a pair of positioning members respectively around two ends of the tube and positioning the positioning members in the mold cavity so as to center the tube in the mold cavity and so as to create, in the mold cavity, a molding space surrounding the entire peripheral surface of the intermediate portion; (d) filling the molding space with a liquid coating composition to form a cover integral with the entire peripheral surface of the intermediate portion, the liquid coating composition containing a resin, a hardener and a coloring material; (e) removing from the mold cavity the tube with the covering and the positioning members, and detaching the positioning members from the tube; and (f) finishing the surface of the covering.

Preferably, the coloring material is prepared by using pearl essence. For mass production, a plurality of mold cavities may be provided in one mold.

BRIEF DESCRIPTION OF THE DRAWINGS

Other features and advantages of the present invention will become apparent in the following detailed description of the preferred embodiment, with reference to the accompanying drawings, in which.

DETAILED DESCRIPTION OF THE PREFERRED EMBODIMENT

Figure 1:
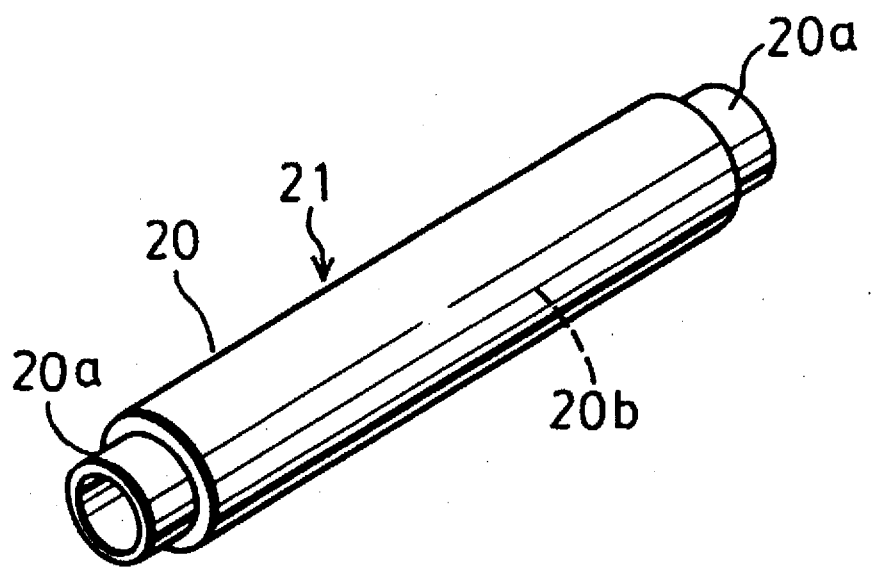
FIG. 1 is a perspective view of a tube product coated with a mottled layer.
Figure 2:
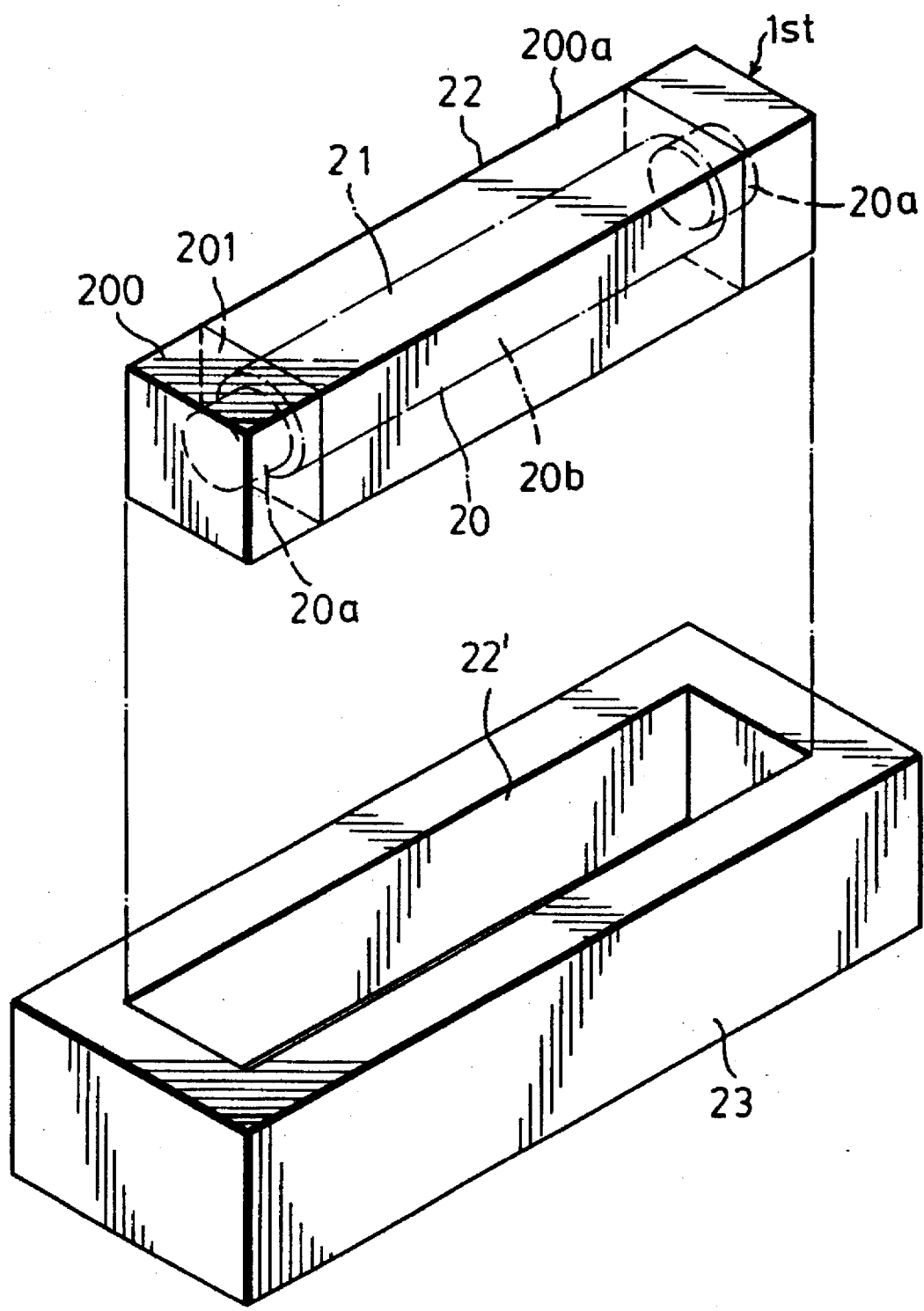
FIG. 2 is a perspective view showing a first positive model and a negative mold according to the invention.
Figure 4:
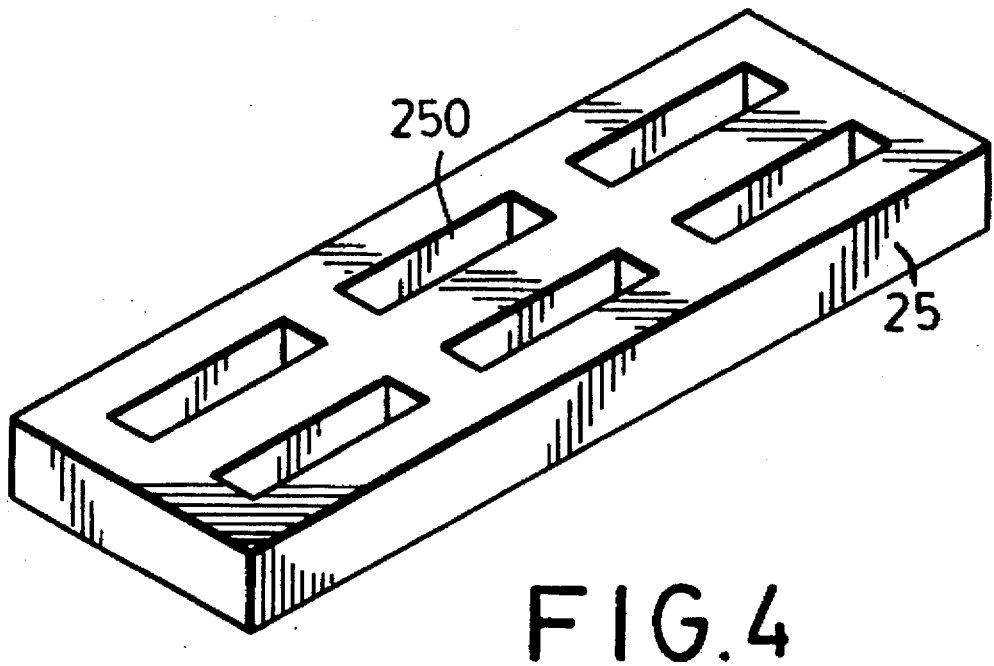
FIG. 4 is a schematic view of a mold having a plurality of mold cavities.
Figure 5:
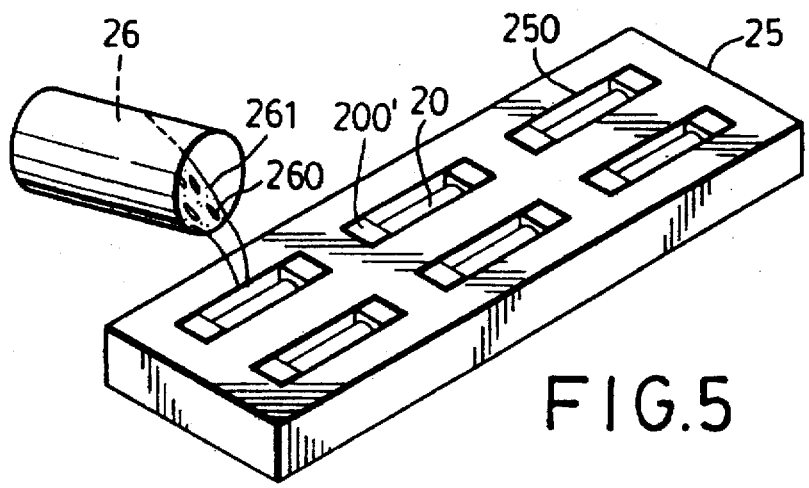
FIG. 5 is a schematic view showing the formation of a covering around each tube product with the use of the mold shown in FIG. 4.
Figure 6:
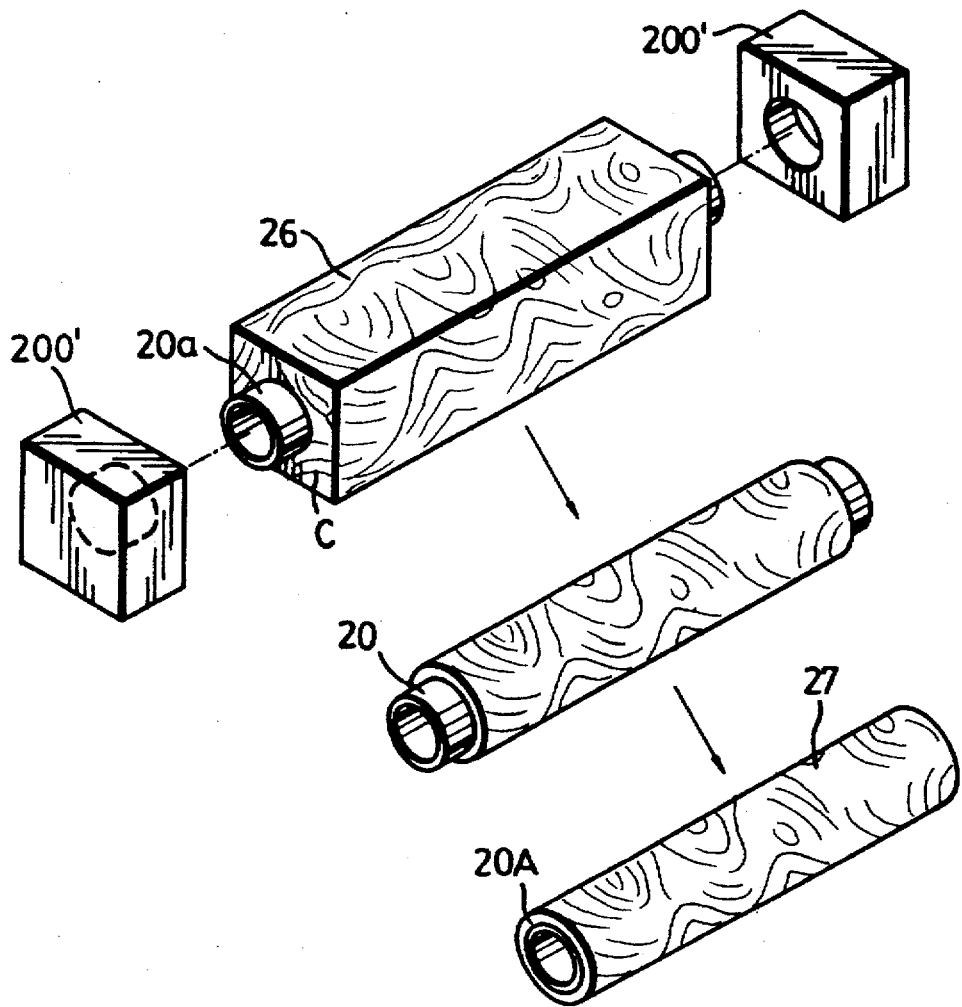
FIG. 6 is a schematic view showing the formation of a tubular member coated with a decorative layer.

Referring to FIGS. 1 to 6, there is shown a method of making a plurality of pen barrels 1 (only one is shown in FIG. 6) according to the present invention. The pen barrel 1 has a mottled and patterned layer 27 cast around the periphery of a tubular member (20A). Referring to FIG. 2, in order to form the tubular member (20A) coated with the mottled and patterned layer 27, a tube product 20 is primarily prepared and is used as model tube. The tube product 20 can be made from metal, wood, or plastics, and has two ends (20a) and an intermediate portion (20b). The intermediate portion (20b) is coated with a covering layer 21 having a thickness identical to that of the mottled and patterned layer 27. Referring to FIG. 2, the tube product 20 coated with the covering layer 21 is centered and is enclosed in an enclosing body (200a). The enclosing body (200a) includes two end parts 200 having two opposite blind bores for receiving and centering two ends (20a) of the tube product 20, and an intermediate hollow part 201 provided around the intermediate portion (20b) of the tube product 20. In this way, a first positive model (1st) is formed. Afterwards, by means of the first positive model (1st), a negative mold 23 having a mold cavity 22' identical in size and shape to the enclosing body (200a) is formed. The negative mold 23 may be made from a material of silicone rubber.

Figure 3:
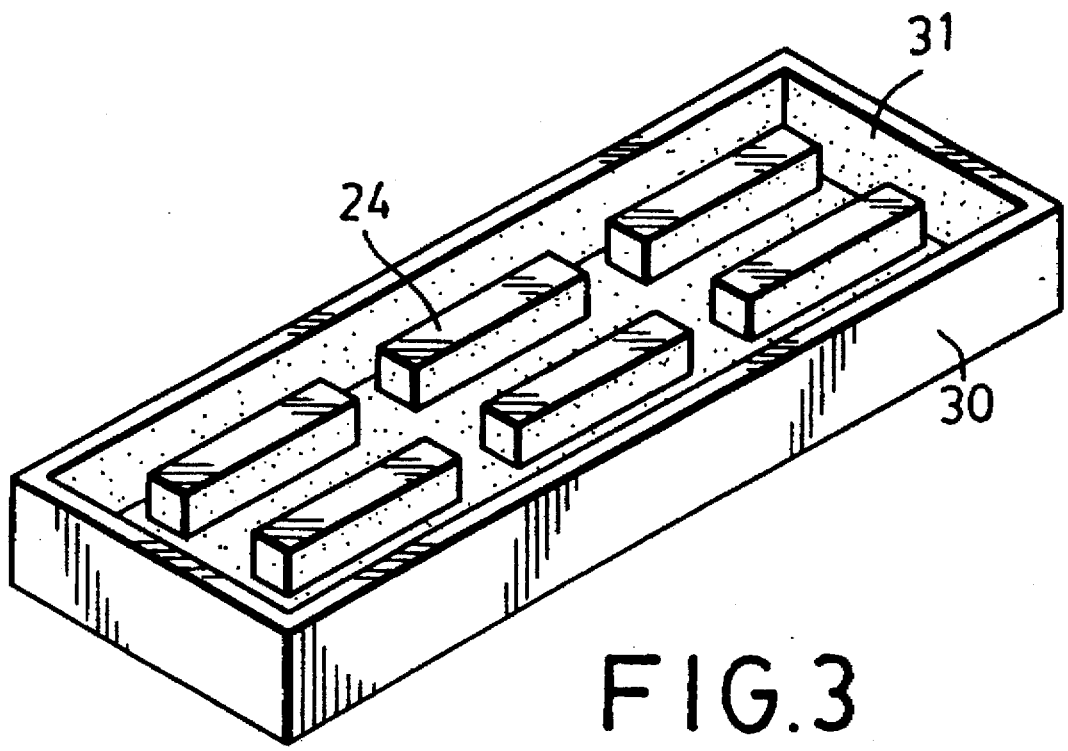
FIG. 3 is a schematic view of a mold box having second positive models arranged spacedly therein.

Referring to FIG. 3, a plurality of second positive models 24 identical in shape and size to the enclosing body (200a) of the first positive model (1st) are formed by the use of the negative mold 23. The second positive model 24 may be formed by filling the mold cavity 22' with a composition containing a polyester resin and a hardener so as to form the positive model 24 after the composition cures and by removing the formed positive model 24 from the mold cavity 22'. By repeating the above process, a plurality of positive models 24 can be formed.

Referring to FIG. 3, a mold box 30, which has a predetermined size and an inner wall that confines a receiving space, is prepared. The inner wall of the mold box 30 is primarily coated with silicone rubber. The second positive models 24 are then arranged spacedly in the receiving space of the mold box 30 such that the top portion of each of the second positive models 24 is flush with the top periphery of the mold box 30. The receiving space of the mold box 30 is filled with silicone rubber. After the silicone rubber cures, the second positive models 24 are removed from the mold box 30. Thus, a mold 25 with a plurality of mold cavities 250 is formed, as shown in FIG. 4.

Referring to FIG. 5, a plurality of tube products 20 together with positioning members 200' are placed in the mold cavities 250 of the mold 25. Each of the positioning members 200' has a structure identical to that of the end part 200 of the enclosing body (200a) of the first positive model (1st). The two ends (20a) of each of the tube products 20 extend respectively into two blind bores of the positioning members 200' so that the two ends (20a) are enclosed add centered in each mold cavity 250. A space is formed surrounding the intermediate portion (20b) of each tube product 20, and a coating composition 26 is poured into the space so as to form a covering (c) around the intermediate portion (20b) of each of the tube products 20. The coating composition 26 includes a resin, a hardener, a coloring material including pearl essence in the form of paste. No chips are used in the coating composition. In a preferred embodiment, the resin is polyester, and the hardener is methyl ethyl ketone peroxide (MEKPO). The covering (c) is formed after the coating composition 26 cures. Referring to FIG. 6, after each covered tube product 20 and the positioning members 200' associated therewith are removed from the mold 25, the positioning members 200' are detached from the covered tube product 20. Thereafter, the covered tube product 20 is machined to have a tubular shape with a predetermined size. The two ends (20a) of the tube product 20 are cut-off, and the covered tube product 20 is then polished to have a decorative layer 27 with a predetermined thickness. The decorative layer 27 has a mottled effect like that of the conventional celluloid pen barrel. It can be appreciated that, by the use of the method of this invention, mottled and patterned pen barrels can be produced without using costly processing steps that are needed in processing celluloid pen barrels.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A method for making a mottled and patterned pen barrel comprising:

(a) preforming a tube having two ends and an intermediate portion between said two ends;

(b) providing at least one mold cavity in a mold for forming said pen barrel;

(c) sleeving detachably a pair of positioning members respectively around said two ends of said tube and positioning said pair of said positioning members in said mold cavity so as to center said tube in said mold cavity and so as to create, in said mold cavity, a molding space surrounding the entire peripheral surface of said intermediate portion;

(d) filling said molding space with a liquid coating composition to form a cover integral with the entire peripheral surface of said intermediate portion, said liquid coating composition containing a resin, a hardener and a chip-free coloring material;

(e) removing from said mold cavity said tube together with said covering and said positioning members, and detaching said positioning members from said tube; and (f) finishing the surface of said covering.

2. A method as claimed in claim 1, wherein said coloring material comprises pearl essence.

3. A method as claimed in claim 1, wherein, in step (b), a plurality of said mold cavities are provided in said mold.

* * * * *